(12) United States Patent
Rose

(10) Patent No.: US 10,939,699 B2
(45) Date of Patent: Mar. 9, 2021

(54) SMOKING MACHINE AND METHOD FOR SMOKING TOBACCO PRODUCTS

(71) Applicant: BORGWALDT KC GMBH, Hamburg (DE)

(72) Inventor: Nils Rose, Ahrensburg (DE)

(73) Assignee: BORGWALDT KC GMBH, Hamburg (DE)

( * ) Notice: Subject to any disclaimer, the term of this patent is extended or adjusted under 35 U.S.C. 154(b) by 89 days.

(21) Appl. No.: 16/076,020

(22) PCT Filed: Feb. 15, 2017

(86) PCT No.: PCT/EP2017/053430
§ 371 (c)(1),
(2) Date: Aug. 7, 2018

(87) PCT Pub. No.: WO2017/140740
PCT Pub. Date: Aug. 24, 2017

(65) Prior Publication Data
US 2019/0159511 A1    May 30, 2019

(30) Foreign Application Priority Data

Feb. 17, 2016  (DE) ..................... 10 2016 001 867.4

(51) Int. Cl.
*A24C 5/34*   (2006.01)
*A24D 3/04*   (2006.01)
*B01D 46/42*  (2006.01)

(52) U.S. Cl.
CPC .............. *A24C 5/3406* (2013.01); *A24D 3/04* (2013.01); *B01D 46/42* (2013.01)

(58) Field of Classification Search
CPC ....................................................... A24C 5/34
See application file for complete search history.

(56) References Cited

U.S. PATENT DOCUMENTS

| | | | | |
|---|---|---|---|---|
| 4,892,453 A | * | 1/1990 | Bantien | A24C 5/352 198/468.11 |
| 5,117,845 A | | 6/1992 | Poulet et al. | |
| 5,845,758 A | * | 12/1998 | Bryant | A24C 5/35 198/347.3 |
| 2004/0084520 A1 | | 5/2004 | Muehl et al. | |
| 2004/0177674 A1 | | 9/2004 | Read et al. | |

(Continued)

*Primary Examiner* — Eric Yaary
(74) *Attorney, Agent, or Firm* — Tarolli, Sundheim, Covell & Tummino LLP

(57) ABSTRACT

In order to reliably ensure the association of smoking products and the results of analysis with the tobacco products and guard against mistakes or data losses, there is provided a smoking machine whose structural components such as the smoke trap, a smoke trap component and/or a tobacco product magazine that is being used are provided with respective identity elements in which items of information specific to the structural component are contained and from which items of information are readable and/or into which items of information are insertible. A method of smoking tobacco products in a smoking machine comprises the storage of information about the respective structural components of the smoking machine and/or the processes of writing-into and reading-out the results of measurements and/or analysis into these identity elements as well as the process of linking to a database.

11 Claims, 1 Drawing Sheet

(56) References Cited

U.S. PATENT DOCUMENTS

2015/0310723 A1 10/2015 Pinkerton
2015/0338311 A1* 11/2015 Marek .................. G01N 1/2247
 73/114.69
2016/0113321 A1 4/2016 Verbeeck et al.

* cited by examiner

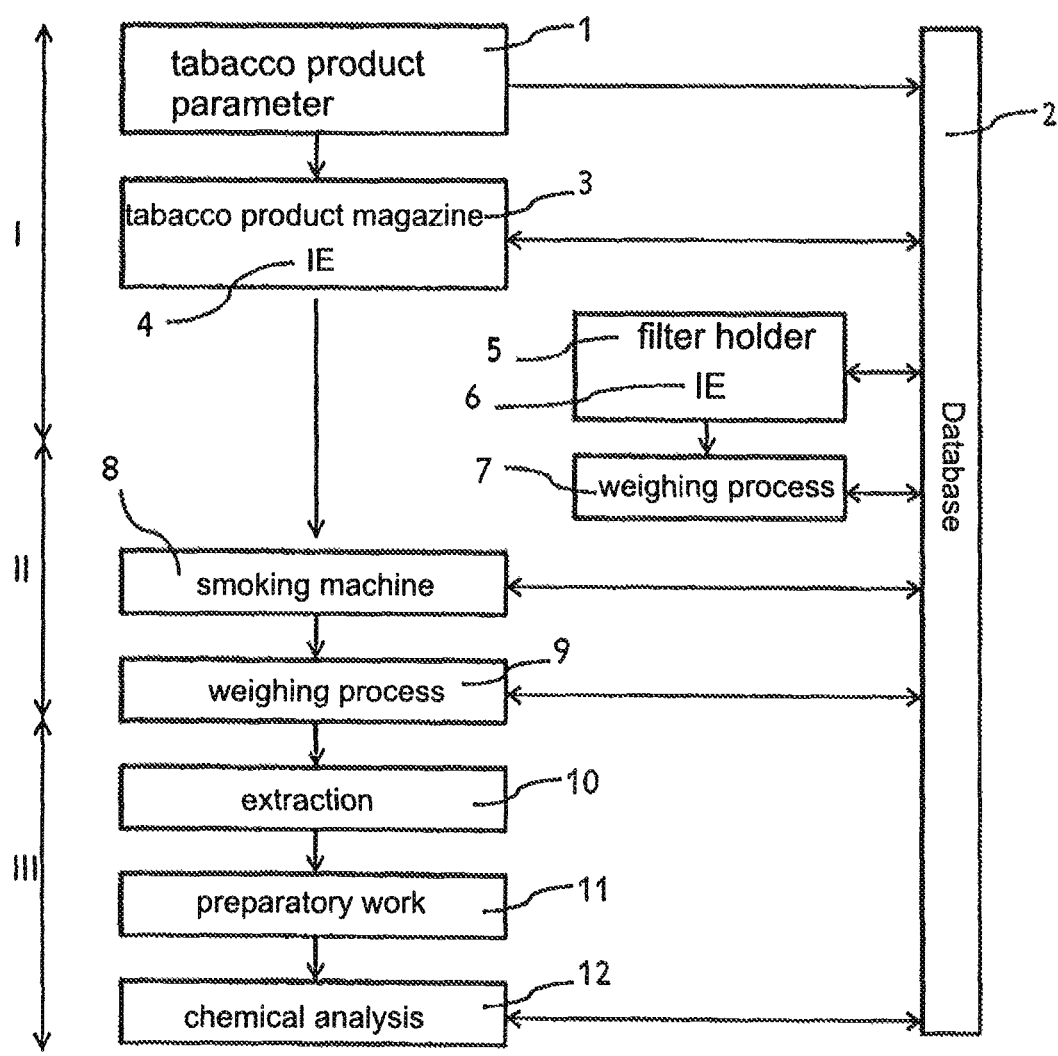

SMOKING MACHINE AND METHOD FOR SMOKING TOBACCO PRODUCTS

RELATED APPLICATIONS

This application corresponds to PCT/EP2017/053430, filed Feb. 15, 2017, which claims the benefit of German Application No. 10 2016 001 867.4, filed Feb. 17, 2016, the subject matter of which are incorporated herein by reference in their entirety.

BACKGROUND OF THE INVENTION

The invention relates to a smoking machine incorporating at least one smoke trap which, for example, comprises a filter holder and a filter element that is arranged therein as well as a method of smoking for tobacco products.

In the case of conventional methods of smoking, the smoking and product parameters are determined manually and set into relationship with the results of the analysis of the smoking process and the subsequent chemical analysis of the smoking products. This requires a great deal of effort, whereby additionally, certainty in regard to the allocation of the data cannot be ensured for example due to confusion of the batches etc.

Consequently, the object of the invention is to produce a smoking machine as well as a method of smoking with the aid of which the association of the smoking products and the results of analysis with the tobacco products which were smoked is reliably ensured, and in particular too, the evaluation and correct smoking results can be reliably determined in a simple manner.

SUMMARY OF THE INVENTION

The object posed is achieved by means of a smoking machine in accordance with the features of claim 1. By using known identity elements such as are described for example in the publications DE 10 2013 107 307 A1, US 2015/0310723 A1 and Neidig, Jörg et al: RFID in der Automatisierumg—ein Buick in die Zukunft in: atp 7.2008, pages 34-38 for the individual components that are not bound to the machine and in conjunction with the structural components used with the smoke machine to which the identity elements that are provided with specific information are respectively attached, it is ensured that there is a constant identification of the components and the structural components which begins with the preparatory stage, continues with the smoking process itself and/or the following evaluation processes. Items of information that are additional to the information in the respective identity elements are readable from the respective identity elements and/or can be written into them which are the results of measurements by laboratory instruments such as the results of a weighing process or the measurement of the amount of moisture in a sample for instance, and these results of measurements and/or smoking parameters are logically linked in the respective identity element and used immediately if necessary for the control, adjustment, documentation and evaluation of the smoking process. The items of information of the identity elements can be entered into a database or automatically passed on and linked with further data. In addition to the identity information, it is also possible for further information to be written into the identity element irrespective of whether this further information follows from a process of linking with data in a database or is independent thereof. For example, information about the tobacco product that is to be smoked such as parameters in regard to its specific properties such as physical measured variables, designations or smoke parameters for example can be written into the identity element of a filter holder for example so that the smoking process can be controlled, monitored or adapted in dependence thereon.

It is very advantageous if the identity element is programmable, whether this be a pre-programming process before attachment to the structural component of the smoking machine or else is a subsequent programming process. Hereby, it is particularly advantageous if the identity element is part of an RFID system, wherein the identity element is provided with either a preset programme or has the possibility of being programmed.

Hereby, it is particularly advantageous that, in addition to the information in the respective identity elements, the results of measurements by laboratory instruments such as perhaps the result of a weighing process or a measurement of the moisture content of a sample are also written-in and that these results of measurements are logically linked in the respective identity element and, if necessary, can be used immediately for the control, adjustment, documentation and evaluation of the smoking process. In the event that a tobacco product magazine or a cigarette magazine which is possibly replaceable is used in conjunction with the smoking machine, then it is advantageous for the tobacco product magazine to also be provided with an identity element.

In particular, a great advantage of the present invention also consists in that the respective items of information that are received during the smoking process are always securely and reliably associated with the components, the smoking products and the results of measurements without the occurrence of mistakes or data losses.

Furthermore, the object posed is achieved by a method for the smoking of tobacco products in accordance with claim 8. Respective identity elements in each of which specific information is stored are associated with the structural components of a smoking machine and in particular with those structural components such as the tobacco product magazine, the smoke trap, the filter holder and/or the filter element that are replaced in the course of the process, whereby said information could be obtained from a predetermined storage process or by writing in specific information from a database for instance. The specific items of information of the identity elements of the smoking machines structural components are linked with the results of measurements and/or analysis by laboratory instruments such as balances, humidity measuring instruments, extraction devices, sample preparation devices, gas chromatographs and/or too with smoking parameters.

An embodiment of the invention that is of especial advantage is one in which the linked information is used for the control and/or adjustment of the process steps of the method of smoking. In dependence on the linked information in which the results of measurements and/or analysis are contained, it is thereby possible to be able to react immediately during the smoking process to deviations or characteristic features in the processing cycle.

BRIEF DESCRIPTION OF THE DRAWING

The invention is described hereinafter with the aid of a preferred exemplary embodiment taken in conjunction with the flow chart in accordance with the attached FIG. 1.

DESCRIPTION

Before the actual smoking process, the values of parameters specific to the tobacco product such as the sample weight, the sample dimensions, the humidity content, the smoking parameters etc. are determined in a first process step 1 and entered into a database 2.

The tobacco products that are to be smoked are arranged in a tobacco product magazine 3 which is provided with an identity element 4, abbreviated to IE hereinafter. The information specific to the tobacco product magazine 3 which is stored in the cigarette magazine IE 4 is likewise entered into the database 2 and linked with the set of parameters that was determined in the first process step. Alternatively, it is also possible for the set of parameters of the tobacco products that was determined in the first process step to be written into the tobacco product magazine IE 4.

A filter holder 5 serving as a component of the smoke trap which is likewise equipped with an identity element, the filter holder IE 6, is weighed in a weighing process 7 and the weight as well as further filter holder parameters if necessary are transferred to the database 2. It is also possible to transfer the weighing result into the filter holder IE 6 and/or into the tobacco product magazine IE 4 and vice versa via the database 2. The linking of the information that is linked to the tobacco product magazine IE 4 and the filter holder IE 6 can be effected in automated manner by a smoking machine 8. The database may be a constituent of the smoking machine 8 or it may be constructed separately and connected to the smoking machine 8 when necessary.

The preparatory work I for the smoking process is finished after running through the previously specified operational sequence and the actual smoking process II begins.

The tobacco products supplied thereto by the tobacco product magazine 3 are smoked in the smoking machine 8, whereby smoking products are deposited in the filter holder 5 and a filter element contained therein. The parameters of the smoking process, such as the number of puffs, the operator, the machine identification number, the day, the time, the environmental conditions etc. are transmitted to the database 2 and linked or associated with the set of parameters of the tobacco product, the items of information of the tobacco product magazine IE 4, of the filter holder IE 6 and/or the result of the weighing process 7.

In a further weighing process 9 after the smoking process, the weight of the filter holder 5 and/or the filter element are weighed and the weighing result supplied to the database 2 in which association thereof with the information of the filter holder IEs 6 of the database 2 takes place in order to determine the difference between the weighing results of the balance 7 and the weighing process 9 for example.

With the weighing of the filter holder 5 after the smoking process, the smoking process II is terminated and the chemical analysis III begins.

The filter holder 5 with the filter element, or only the filter element and a wash-out or wipe-out product of the filter holder 5, the smoking product of the smoking process is extracted in an extraction step 10 and supplied to a sample preparation process 11 in order for it to be chemically analyzed thereafter in a gas chromatograph analysis process 12 for example.

The result of the analysis is likewise supplied to the database 2 and, inter alia, associated with the filter holder IE 6, the tobacco product and the parameters of the smoking process.

Due to the use of identity elements for the individual structural components of the smoking machine and the smoking processes, it is possible to enter all the information about these structural components and the data obtained from the individual method processes into a database in order to control and adapt the smoking process in accord with this information. However, it is also particularly advantageous to store the respectively received results of the process steps in the individual identity elements of the respective structural components.

The invention was described above on the basis of a preferred exemplary embodiment in connection with a sample tracking system. However, the smoking machine or the method of smoking is also modifiable in individual cases in accord with the circumstances without thereby departing from the scope of the invention.

For example, the smoking machine 8 according to the invention could also be one such without a filter holder and/or without a filter element for the smoke trap 5.

The invention claimed is:

1. A smoking machine (8) incorporating a smoke trap (5) wherein the smoking machine (8), the smoke trap (5) and/or a component of the smoke trap (5) comprises at least one identity element (4, 6) which contains information specific to the smoke trap (5) and/or the smoke trap component and from which or into which items of information are readable and/or are insertible which are the results of measurements from laboratory instruments comprising at least one of balances, humidity measuring instruments, and length and diameter measuring instruments.

2. A smoking machine (8) in accordance with claim 1, wherein the information is insertible into a database (2) or is readable from it.

3. A smoking machine (8) in accordance with claim 1, wherein the database (2) is a constituent of the smoke machine.

4. A smoking machine (8) in accordance with claim 1, wherein the smoking machine (8) is connected to an external database (2) and communicates therewith.

5. A smoking machine (8) in accordance with claim 1, wherein the identity element (4, 5) is programmable.

6. A smoking machine (8) in accordance with claim 1, wherein the identity element (4, 5) is part of an RFID system.

7. A smoking machine (8) in accordance with claim 1, wherein the smoking machine (8) comprises a tobacco product magazine (3) which is provided with an identity element (4).

8. A method comprising smoking tobacco products in the smoking machine of claim 1.

9. A method in accordance with claim 8, wherein the items of information are used for control, monitoring and/or adjustment of process steps of the method.

10. A method in accordance with claim 8, wherein the laboratory instruments comprise at least one of barometers, hygrometers, extraction devices, sample preparation devices, and gas chromatographs.

11. A smoking machine in accordance with claim 1, wherein the laboratory instruments comprise at least one of barometers, hygrometers, extraction devices, sample preparation devices, and gas chromatographs.

* * * * *